United States Patent [19]

Reeves

[11] 4,225,072
[45] Sep. 30, 1980

[54] GLASS CUTTER FOR FRACTURING PRESCORED GLASS

[76] Inventor: Max D. Reeves, 1640 Candlelight Dr., Las Cruces, N. Mex. 88001

[21] Appl. No.: 10,950

[22] Filed: Feb. 9, 1979

[51] Int. Cl.³ .................. C03B 33/02; C03B 33/10
[52] U.S. Cl. ................................ 225/104; 225/96.5
[58] Field of Search .................. 225/104, 93, 96.5

[56] References Cited

U.S. PATENT DOCUMENTS

| 969,256 | 9/1910 | Durle | 225/104 X |
| 1,704,872 | 3/1929 | Schlenstedt | 225/104 X |
| 2,295,052 | 9/1942 | Rosa | 225/104 X |
| 3,157,235 | 11/1964 | Raizk et al. | 225/104 X |

Primary Examiner—Frank T. Yost
Attorney, Agent, or Firm—Linval B. Castle

[57] ABSTRACT

A glass cutter for fracturing prescored sheet glass includes a C-shaped frame having in one end a glass supporting anvil and at its opposite end a screw operated breaker point. The glass sheet is positioned on the anvil with its scored line centered over a V-grooved channel in the anvil surface. A breaker screw is rotatably threaded in the opposite end of the frame and the screw which is perpendicular to the glass surface is provided with a breaker point that is brought into contact with the glass surface and then very slightly rotated to fracture the prescored glass along a very short length of the score line. By repeating these short fracturing steps, very intricate shapes may be cut in the glass without accidental breakage thereof.

4 Claims, 6 Drawing Figures

GLASS CUTTER FOR FRACTURING PRESCORED GLASS

BRIEF SUMMARY OF THE INVENTION

This invention relates to glass cutters and particularly to a new and improved glass cutter for very accurately fracturing previously scored glass.

Sheet glass has traditionally been cut by first scoring the sheet with a hardened cutter wheel or diamond cutter and then lightly tapping the prescored area with a spherical hammer to start and propagate the crack along the prescored line. Many improvements have been made to this traditional method, such as the use of electrically operated reciprocating hammers that rapidly fracture the prescored sheet, automatic cutters for fracturing straight edged glass strips, cutters specifically designed for cutting laminated automotive safety glass, etc. Some of the improvements employ breaker bars for fracturing a prescored sheet supported on a flat surface and some show the use of a concave roller surface for supporting the sheet. None of the prior art glass cutters are suitable for cutting irregular shapes, such as small radius curves, circles, round or irregular shaped holes, or sharp included angles such as encountered in the letter "V". It is important to be able to make such irregular small designs, particularly in the design construction of stained glass artwork, Tiffany-type lamps, and other decorative glass objects.

Briefly described, the glass cutter of the present invention includes a C-shaped frame having at its upper end a vertical threaded screw with a pointed lower end that overlies the center of a channel in the surface of a glass supporting anvil on the frame's lower end. A glass sheet prescored with any desired intricate shape is then placed on the anvil with the prescored line facing down and aligned with the breaker point on the threaded breaker screw. After the breaker point is brought into contact with the glass surface, a slight further rotation of the screw will cause the glass to fracture along a very short length of the prescored line. Readjusting the glass and again exerting a very small force against the surface will cause further small fracturing along the prescore. By thus making very short fractures in the glass, very irregular and complex shapes may be easily and accurately cut.

DESCRIPTION OF THE DRAWINGS

In the drawings which illustrate a preferred embodiment of the invention.

DETAILED DESCRIPTION

Figure 1:
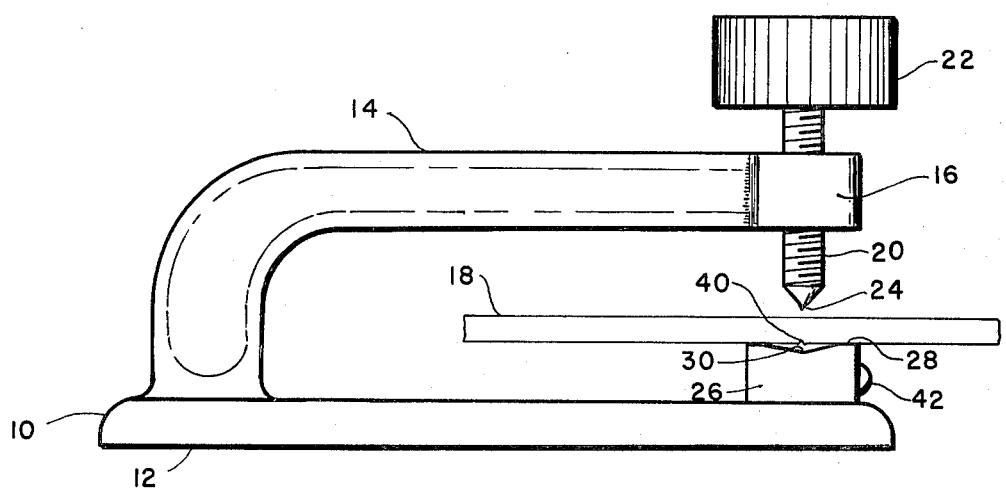
FIG. 1 is a side elevation view of the glass cutter of the invention.
Figure 2:
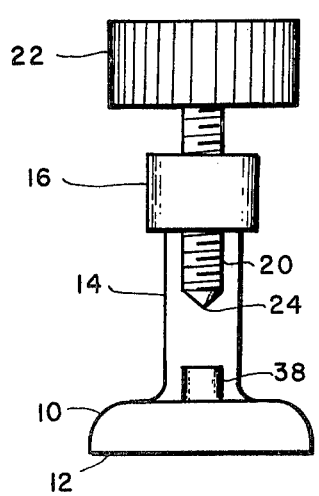
FIG. 2 is a front elevation view of the cutter of FIG. 1.

The glass cutter illustrated in FIGS. 1 and 2 includes an elongated base section 10 preferably having a flat lower surface 12 so that the cutter may be vertically supported on a work table. Attached to one end of the elongated base section 10 is an upper frame section 14 which, as illustrated in FIG. 1, rises vertically from the base section 10 to a horizontal section that terminates in a cylindrical block 16. The horizontal portion of the upper frame section 14 is preferably parallel to the lower section 10 and is separated therefrom so that a sheet of glass 18 may readily be positioned therebetween, as will be subsequently explained.

Figure 3:
FIG. 3 is an elevation view of an anvil particularly suitable for fracturing thick glass.
Figure 4:
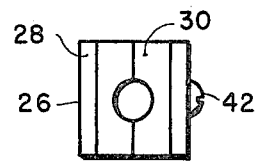
FIG. 4 is a plan view of the anvil illustrated in FIG. 3.

The cylindrical block 16 contains a vertical threaded hole into which is threaded a breaker screw 20 which extends through the block 16 and terminates at its upper end in a knurled handle 22. The opposite or lower end of the breaker screw 20 is turned to provide a breaker point 24, the apex of which lies on the longitudinal axis of the screw 26 so that the point 24 will always remain centered as the breaker screw 20 is rotated. Positioned directly below the breaker screw and attached to the top surface of the base section 10 is an anvil 26 having a flat top glass supporting surface 28 that is perpendicular to the longitudinal axis of the breaker screw 20. As best illustrated in FIGS. 3 and 4, the glass supporting surface 28 of anvil 26 contains a longitudinal channel 30 which may be in the form of a V-section, as illustrated, or if desired, may have an oval or concave cross-section. Channel 30 preferably has a uniform width so that the remaining lands that form the glass supporting surface 28 are also preferably uniform. It is important to note that the anvil 26 must be positioned on base section 10 so that the breaker point 24 is aligned with the center line of the channel 30 so that when a sheet of glass 18 is supported on the anvil 26, the breaker point will touch the glass surface at a point midway between the lands of the supporting surface 28.

Figure 5:
FIG. 5 is an elevation view of an angle suitable for fracturing thin sheet glass.
Figure 6:
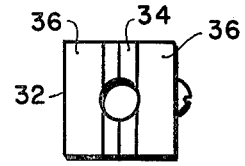
FIG. 6 is a plan view of the anvil illustrated in FIG. 5.

FIGS. 5 and 6 illustrate a second anvil embodiment particularly suitable for fracturing thin sheet glass. As illustrated in FIGS. 3 and 4, the channel 30 is relatively wide and leaves narrow lands on the glass supporting surface 28. Such an embodiment is particularly useful for fracturing relatively thick glass sheets 18. The anvil 32 illustrated in FIGS. 5 and 6 has a relatively narrow and shallow channel 34 and the lands on the glass supporting surface 36 are therefore relatively wide. The anvil 32 illustrated in FIGS. 5 and 6 is most suitable for thin glass sheets as previously explained.

Since it is advantageous to change anvils for various glass thicknesses, a provision must be made to assure that interchanged anvils are properly positioned with respect to the breaker point 24. Accordingly, the end of the base section 10 underlying the breaker screw 20 contains a stud 38 as illustrated in FIG. 2. Stud 38 is coaxial with the screw 20 and is preferably a steel rod of approximately one-half inch in diameter and extending approximately one-half inch above the top surface of the base section 10. Each anvil, such as the anvil 26 of FIG. 4 and anvil 32 of FIG. 6, contains a centrally located aperture of a size corresponding to the diameter of stud 38 so that any anvil may be mounted over the stud 38 and locked by a locking screw, such as the screw 42 that is threaded through the side wall of the anvil 26.

OPERATION

In operation, a sheet of glass, such as the glass 18 of FIG. 1, is first prescored with a conventional glass cutter, such as a hardened steel roller or diamond cutter, in accordance with the desired pattern to be cut. The sheet 18 is then placed on the glass support surface 28 of the anvil 26 with the score 40 centered over the channel and directly beneath the breaker point 24. The breaker screw 20 is then turned by rotation of handle 22 so that the tip of the breaker point touches the top surface of the prescored glass 18. Handle 22 is then rotated a very slight amount to exert a force of the breaker point 24 against the surface of the glass 18. When the breaker screw 20 is thus turned, a very short length of the prescored glass will become fractured. For example, rotation of the handle 22 by an angle of only 4° or 5° may produce a fracture of approximately one centimeter along the prescored line 40 in the glass 18. Breaker screw 20 is then reverse turned to lift the breaker point 24 from the surface and the glass 18 is moved on the anvil support surface 28 so that the breaker point 24 overlies an adjacent unfractured section of the score line 40. The breaker point 24 then is brought into contact at a slight rotation will advance the fracture another small length along the score line. By thus advancing the score line in very small segments, very intricate and complex shapes may be cut in the glass without accidental breakage of any other section of the glass.

I claim:

1. A glass cutter for fracturing prescored glass, said cutter comprising:
   a frame having an elongated base section and an elongated upper section having a first end attached to the first end of said base section and extending over said base section and separated therefrom, said base section and said upper frame section forming a "C" shape;
   an anvil positioned adjacent the second end of said elongated base and on the surface thereof facing said upper frame section, said anvil having a flat glass supporting surface and a channel of substantially uniform width and depth along the length of the center line of said glass supporting surface; and
   a threaded breaker screw having a breaker point on one end of its longitudinal axis, said screw being rotatably positioned in the second end of said elongated upper section, said longitudinal axis being perpendicular to said glass supporting surface of said anvil, said breaker point being substantially aligned with the center line of said channel in said anvil.

2. The glass cutter claimed in claim 1 wherein said anvil has a central aperture having an axis perpendicular to said glass supporting surface, said aperture adapted to mate with a stud in the second end of said base section, said stud being coaxial with said threaded breaker screw.

3. The glass cutter claimed in claim 2 wherein said anvil has releasably locking means for rigidly locking said anvil to said stud.

4. The glass cutter claimed in claim 3 wherein said threaded breaker screw extends through said second end of said upper section and has, on the end opposite said breaker point, a manually operable breaker screw turning handle.

* * * * *